United States Patent [19]

Sato et al.

[11] 4,381,799

[45] May 3, 1983

[54] CHANGEOVER VALVE UNIT FOR POWER-ASSISTED STEERING SYSTEMS

[75] Inventors: Yoshimi Sato, Susono; Nobuo Hiraiwa, Toyota; Akira Hasegawa, Susono, all of Japan

[73] Assignee: Toyota Jidosha Kogyo Kabushiki Kaisha, Toyota, Japan

[21] Appl. No.: 224,015

[22] Filed: Jan. 12, 1981

[30] Foreign Application Priority Data

Jul. 8, 1980 [JP] Japan .................................. 55-93630

[51] Int. Cl.³ .............................................. F15B 9/10
[52] U.S. Cl. .......................... 137/625.68; 137/625.69; 91/375 A; 251/50
[58] Field of Search ...................... 137/625.68, 625.69, 137/625.65; 251/50; 91/375 A, 368, 382

[56] References Cited

U.S. PATENT DOCUMENTS

| | | | |
|---|---|---|---|
| 788,867 | 5/1903 | Wehner | 251/50 |
| 3,176,721 | 4/1965 | Gordon | 251/50 |
| 3,292,499 | 12/1966 | Duffy | 91/368 |
| 3,610,105 | 10/1971 | Tomita | 91/375 A |
| 3,645,296 | 2/1972 | Adams | 91/375 A |
| 3,672,259 | 6/1972 | Duffy | 91/382 |

Primary Examiner—Paul E. Maslousky
Attorney, Agent, or Firm—Parkhurst & Oliff

[57] ABSTRACT

A changeover valve unit for a power-assisted steering system includes input and output shafts arranged for relative rotation on aligned axes, a torsion bar interconnecting the shafts, a spool valve element surrounding the input shaft and arranged to be axially displaced in response to relative rotation of the shafts for controlling the supply of pressurized fluid to a hydraulic cylinder associated with the steering system, and a displacement mechanism for the spool valve element. The valve unit further includes an annular retainer member engaged with one end of the spool valve element to form an oil chamber, a compression spring assembled within the oil chamber to bias the spool valve element toward the displacement mechanism, and an annular orifice formed around the input shaft by means of the retainer member to permit the flow of fluid between the oil chamber and the interior of the spool valve element.

6 Claims, 4 Drawing Figures

CHANGEOVER VALVE UNIT FOR POWER-ASSISTED STEERING SYSTEMS

BACKGROUND OF THE INVENTION

The present invention relates to a power-assisted steering system for wheeled vehicles, and more particularly to an improvement of a changeover valve unit for the power-assisted steering system which includes a spool valve element for controlling the supply of fluid to a hydraulic cylinder associated with the steering system.

In a conventional changeover valve unit for such a power-assisted steering system as the rack-and-pinion type, a cylindrical spool valve element is concentrically assembled with an input shaft which is coaxially connected to an output shaft for relative rotation caused by the operator's effort applied to the steering wheel. The spool valve element is axially displaced upwards or downwards in response to relative rotation of the input and output shafts to change over the flow of pressurized fluid between a hydraulic cylinder associated with the steering system and a source of fluid pressure in the form of a fluid pump. To provide a displacement mechanism for the spool valve element, the input shaft is formed at the outer periphery of its inner end portion with helical follower grooves in which steel balls are rotatably contained and engaged with a portion of the spool valve element in such a manner that the spool valve element is displaced proportionally to the relative rotation angle between the input and output shafts. In this displacement mechanism, it is required that the steel balls be rotatably retained by a retainer ring or collar with a slight clearance within the follower grooves to ensure smooth movement of the steel balls along the follower grooves. For this reason, an intervening space inevitably occurs between the steel balls and the follower grooves. This results in increase of hysteresis in the fluid control characteristic of the changeover valve unit, as shown by imaginary lines in FIG. 1. This means that a smooth return operation of the steering wheel may not be expected.

It has also been experienced that axial vibration of the spool valve element occurs due to fluctuation of the fluid pressure caused by the pulsation of the fluid pump and that the operator encounters unpleasant noises caused by the axial vibration of the spool valve element. For the purpose of eliminating such a defect, a compression coil spring is interposed between one end of the spool valve element and a bearing for the input shaft to resiliently urge the steel balls against one side-wall of each of the follower grooves so as to restrain the vibration of the spool valve element. However, if the load of the compression spring is insufficient, the desired effect may not be expected, and if the load of the compression spring becomes excessive upon displacement of the spool valve element, the operational feel of the steering wheel will suffer.

SUMMARY OF THE INVENTION

It is, therefore, a primary object of the present invention to provide an improved changeover valve unit in which a compression spring effectively cooperates with the flow of fluid passing through the interior of the spool valve element to provide a kind of oil damper which acts to reduce the load of the compression spring so as to ensure good operational feel in steering and to reliably restrain axial vibration of the spool valve element, thus eliminating unpleasant noises.

Accordingly, the above object is accomplished by provision of a changeover valve unit for a power-assisted steering system including a driven member for operative connection with the steering road wheel of a wheeled vehicle and arranged to be power-assisted by a hydraulic cylinder. The changeover valve unit comprises a housing provided with a fluid inlet for connection to a source of fluid pressure and a fluid outlet for connection to the hydraulic cylinder, input and output shafts arranged for relative rotation on aligned axes within the housing, the output shaft being operatively connected to the driven member, a resilient member interconnecting the input and output shafts to permit relative rotation of the shafts, a spool valve element in surrounding relationship with the input shaft and arranged to be displaced in response to relative rotation of the shafts in an axial direction for controlling the flow of fluid between the fluid inlet and outlet, and a displacement mechanism for conducting axial displacement of the spool valve element in response to relative rotation of the shafts, and wherein the improvement comprises an annular member engaged with one end of the spool valve element to form an oil chamber isolated from the interior of the spool valve element, resilient means for biasing the spool valve element in the axial direction, and orifice means for throttling the flow of fluid between the oil chamber and the interior of the spool valve element. In operation, the flow of fluid between the oil chamber and the interior of the spool valve element across the orifice means acts to absorb any vibration of the spool valve element.

Preferably, the annular member is in the form of an annular retainer member coupled with one end of the spool valve element in a fluid-tight manner, the resilient means is a compression coil spring assembled within the oil chamber and engaged at one end thereof with the retainer member and at the other end thereof with the inner wall of the oil chamber, and the orifice means is in the form of an annular orifice formed between the inner periphery of the retainer member and the outer periphery of the input shaft.

BRIEF DESCRIPTION OF THE DRAWINGS

Additional objects and advantages of the present invention will be more readily apparent from the following detailed description of a preferred embodiment thereof when taken together with the accompanying drawings in which.

DESCRIPTION OF THE PREFERRED EMBODIMENT

Figure 2:
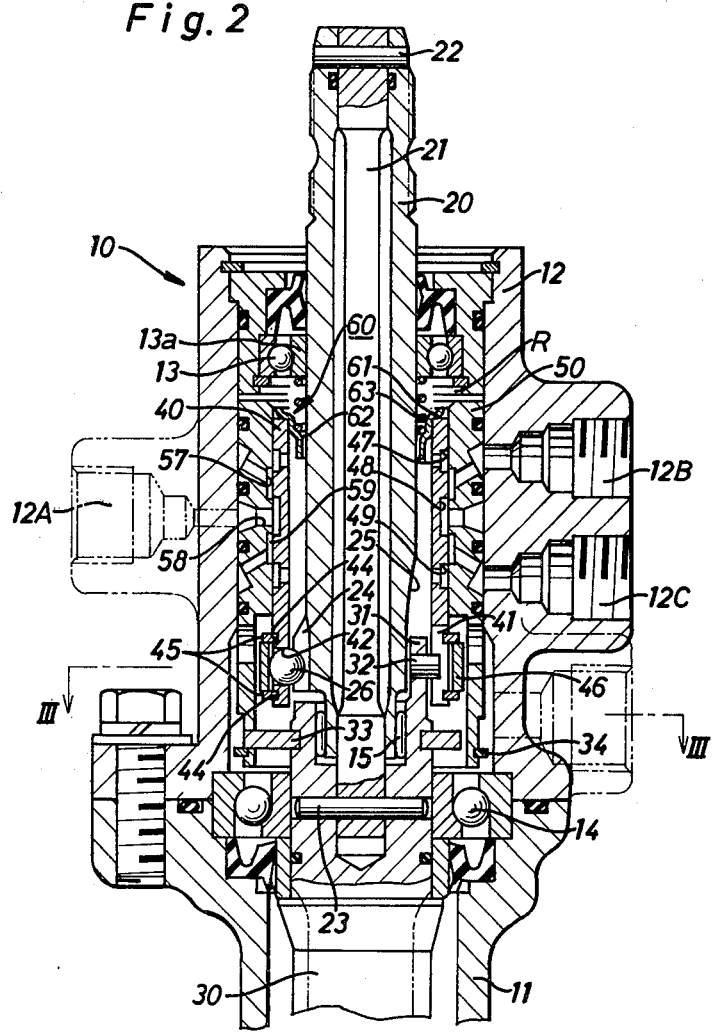
FIG. 2 illustrates a sectional elevation of a changeover valve unit in accordance with the present invention, which is shown along the plane of line II—II in FIG. 3.
Figure 3:
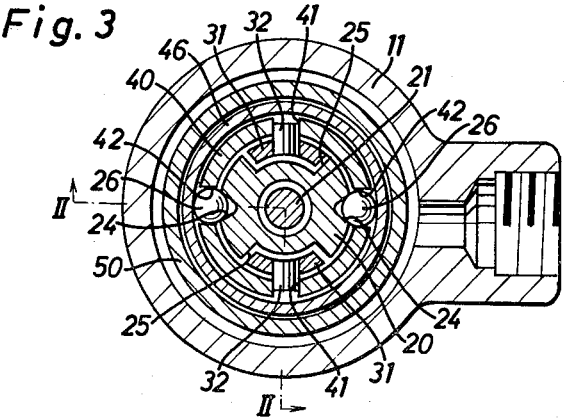
FIG. 3 is a cross-sectional view taken along the plane of line III—III in FIG. 2.

Referring now to the drawings, FIGS. 2 and 3 illustrate a preferred embodiment of a changeover valve unit for a power-assisted steering system according to the present invention, which valve unit includes a housing 12 fitted to a gear casing 11 in a fluid-tight manner. Input and output shafts 20 and 30 are coaxially supported by a pair of ball bearings 13 and 14 carried on the housing 12. Arranged within the housing 12 are a cylindrical spool valve element 40 and a sleeve-like valve casing 50 concentrically with the input shaft 20. The input shaft 20 is supported at its lower end by a needle bearing 15, which is assembled within the upper end of output shaft 30. A torsion bar reaction member 21 is connected at its one end to the upper end of input shaft 20 by means of a pin 22 and at its other end to the output shaft 30 by means of a pin 23. As can be well seen in FIG. 3, the input shaft 20 is formed at the outer periphery of its lower end portion with a pair of helical follower grooves 24 and a pair of axial recesses 25. Each of the follower grooves 24 has a V-shaped cross-section and contains a steel ball 26 therein.

The output shaft 30 is formed at its upper end with a pair of axial projections 31 which extend into each of the axial recesses 25 of input shaft 20. A pair of guide pins 32 are radially fixed to each of the axial projections 31 and slidably engage with a pair of axial guide slots 41 which are formed in the lower end portion of the spool valve element 40 and opposed to each other. Thus, the guide pins 32 act to guide axial movement of the spool valve element 40 through their slidable engagement with the axial slots 41. In this assembly, each of the axial projections 31 extending from output shaft 30 is arranged within each of the axial recesses 25 of input shaft 20 with a circumferential clearance to permit relative rotation of the input and output shafts 20 and 30. The output shaft 30 is further integrally formed with a pinion which is meshed with a rack member (not shown) for operative connection with the steering road wheels of a wheeled vehicle. The rack member is arranged to be power-assisted by a hydraulic cylinder (not shown) associated with the steering system.

The spool valve element 40 is axially slidable within the valve casing 50 and is formed at its lower end portion with a pair of radial bores 42 in which the steel balls 26 are rotatably contained. The spool valve element 40 has a pair of annular grooves 44 located at opposite sides of each of the steel balls 26, and a retainer ring 46 is fixed in place by means of a pair of retaining rings 45 resiliently engaged with the respective annular grooves 44, the steel balls 26 being rotatably retained by the retainer ring 46. The valve casing 50 is formed at its inner periphery with a pair of fluid grooves 57 and 59 which are arranged to selectively communicate with annular fluid grooves 47, 48, 49 of the spool valve element 40. The central annular fluid groove 48 of spool valve element 40 is arranged to constantly communicate with central radial holes 58 of the valve casing 50 which are in open communication with an inlet port 12A of housing 12, and the annular fluid grooves 57 and 59 are respectively in open communication with outlet ports 12B and 12C of housing 12.

A thrust plate 33 is rotatably coupled at its inner periphery with the upper portion of output shaft 30 and fixedly engaged at its outer periphery with the lower end of valve casing 50 by means of a retaining ring 34. With this assembly, the thrust plate 33 acts to permit rotation of the output shaft 30 relative to the valve casing 50 and to prevent rotation of the valve casing relative to the inner peripheral wall of housing 12.

Figure 1:
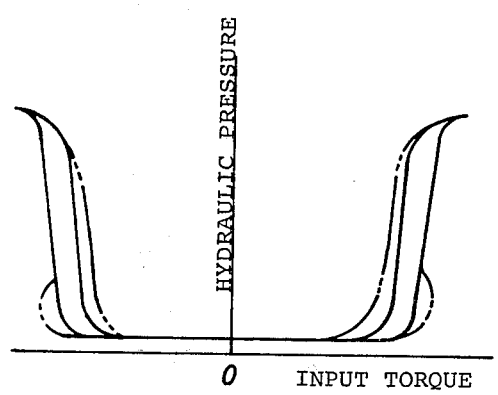
FIG. 1 illustrates the fluid flow characteristics of prior art valve units.
Figure 4:
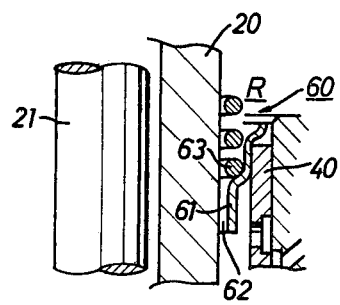
FIG. 4 is an enlarged sectional view of a portion of FIG. 2 showing an anti-vibration mechanism of the valve unit.

Hereinafter, an anti-vibration mechanism for the spool valve element 40 will be described in detail with reference to FIGS. 2 and 4. The improvement of the present invention is directed to the anti-vibration mechanism 60 which is constructed in the form of a kind of oil damper. The oil damper mechanism 60 includes an annular retainer member 61 engaged with the upper opening end of spool valve element 40 to form an annular oil chamber R around the input shaft 20 and further includes a compression coil spring 63 interposed between the retainer member 61 and an inner race 13a of the ball bearing 13 with a predetermined load. The oil chamber R formed by retainer member 61 communicates with the interior of spool valve element 40 through an annular orifice 62 formed between the inner periphery of retainer member 61 and the outer periphery of input shaft 20. When the spool valve element 40 is in a neutral position, the steel balls 26 are resiliently engaged with one side wall of the respective helical grooves 24 due to the biasing force of coil spring 63. This serves to reliably prevent axial vibration of the steel balls 26 within the respective helical grooves 24.

When the input shaft 20 is rotated by a torque applied to the steering wheel to distort the torsion bar 21, the steel balls 26 each roll along one side-wall of the helical grooves 24 to displace the spool valve element 40 upwards or downwards from its neutral position. Upon displacement of the spool valve element 40, the fluid under pressure from the inlet port 12A flows into the hydraulic cylinder of the steering system through one of the outlet ports 12B and 12C, while the fluid discharged from the hydraulic cylinder returns into the fluid reservoir through the other outlet port. In case the pressure of fluid flow fluctuates during the operation, the fluid retained in the oil chamber R flows into and from the interior of spool valve element 40 across the annular orifice 62 to absorb any vibration of the spool valve element 40 caused by the pressure fluctuation. For this reason, even if the load of compression spring 63 is reduced to decrease resistance to the spool valve element 40, the axial vibration of spool valve element 40 is reliably suppressed by the flow of fluid between the oil chamber R and the interior of spool valve element 40, and the occurrence of unpleasant noises caused by the pressure fluctuation is effectively prevented.

Although, in the above embodiment, the orifice 62 is formed between the inner periphery of retainer member 61 and the outer periphery of the input shaft, the orifice 62 may be replaced with an axial orifice formed by an axial recess in the input shaft 20. In a modification of the present invention, an annular sealing member may be attached to the upper end of the spool valve element 40 to receive the retainer member 61 thereon, thereby to seal the oil chamber R more reliably. Alternatively, in the actual applications of the present invention, it is obvious that many modifications may be made in accordance with assembling conditions of the spool valve element, input shaft and the like.

What is claimed is:

1. In a changeover valve unit for a power-assisted steering system comprising:
    a housing provided with a fluid inlet and a fluid outlet;
    input and output shafts arranged for relative rotation on aligned axes within said housing;
    a reaction member interconnecting said input and output shafts to permit relative rotation of said shafts;
    a spool valve element in surrounding relationship with said input shaft and arranged to be displaced in response to relative rotation of said shafts in an axial direction for controlling the flow of fluid between said fluid inlet and said fluid outlet;

resilient means for biasing said spool valve element in the axial direction; and means for causing axial displacement of said spool valve element in response to relative rotation of said shafts;

the improvement wherein an annular member is engaged at an outer periphery thereof with one end of said spool valve element and positioned in place under the biasing force of said resilient means to form an oil chamber subdivided from the interior of said spool valve element; and orifice means is formed between the inner periphery of said annular member and the outer periphery of said input shaft for throttling the flow of fluid between said oil chamber and the interior of said spool valve element.

2. In a changeover valve unit as claimed in claim 1, wherein said orifice means is an annular orifice.

3. In a changeover valve unit as claimed in claim 1 or 2, wherein said resilient means is a compression spring assembled within said oil chamber and engaged at one end thereof with said annular member and at the other end thereof with an inner wall of said oil chamber.

4. In a changeover valve unit as claimed in claim 3, wherein said compression spring is engaged at the other end thereof with an inner race of a ball bearing for said input shaft.

5. In a changeover valve unit as claimed in claim 3, wherein said annular member is in the form of an annular retainer member receiving the one end of said compression spring thereon.

6. In a changeover valve unit for a power-assisted steering system comprising:

a housing provided with a fluid inlet and a fluid outlet;

input and output shafts arranged for relative rotation on aligned axes within said housing;

a reaction member in the form of a torsion bar interconnecting said input and output shafts to permit relative rotation of said shafts;

a spool valve element in surrounding relationship with said input shaft and arranged to be displaced in response to relative rotation of said shafts in an axial direction;

a valve casing in surrounding relationship with said spool valve element within said housing and cooperating with said spool valve element for controlling the flow of fluid between said fluid inlet and said fluid outlet;

a compression coil spring for biasing said spool valve element in the axial direction; and means for causing axial displacement of said spool valve element in response to relative rotation of said shafts;

the improvement wherein an annular retainer member is engaged at an outer periphery thereof with one end of said spool valve element and positioned in place under the biasing force of said compression coil spring to form an oil chamber subdivided from the interior of said spool valve element; and orifice means is formed between the inner periphery of said annular retainer member and the outer periphery of said input shaft for throttling the flow of fluid between said oil chamber and the interior of said spool valve element.

* * * * *